(12) United States Patent
Lindstrom et al.

(10) Patent No.: US 10,020,533 B2
(45) Date of Patent: Jul. 10, 2018

(54) LAMINATED LITHIUM-SULPHUR CELL

(71) Applicant: Oxis Energy Limited, Oxfordshire (GB)

(72) Inventors: Ove Lindstrom, Oxfordshire (GB); Mariya Ivanova, Oxfordshire (GB)

(73) Assignee: Oxis Energy Limited, Oxfordshire (GB)

( * ) Notice: Subject to any disclaimer, the term of this patent is extended or adjusted under 35 U.S.C. 154(b) by 97 days.

(21) Appl. No.: 14/912,139

(22) PCT Filed: Aug. 13, 2014

(86) PCT No.: PCT/GB2014/052474
§ 371 (c)(1),
(2) Date: Feb. 15, 2016

(87) PCT Pub. No.: WO2015/022529
PCT Pub. Date: Feb. 19, 2015

(65) Prior Publication Data
US 2016/0204473 A1    Jul. 14, 2016

(30) Foreign Application Priority Data

Aug. 15, 2013 (EP) .................................. 13180522
Apr. 2, 2014 (GB) .................................. 1405957.0

(51) Int. Cl.
*H01M 10/05* (2010.01)
*H01M 4/40* (2006.01)
(Continued)

(52) U.S. Cl.
CPC ....... *H01M 10/052* (2013.01); *H01M 2/1673* (2013.01); *H01M 4/382* (2013.01);
(Continued)

(58) Field of Classification Search
CPC ........... H01M 10/0583; H01M 4/5815; H01M 10/045
See application file for complete search history.

(56) References Cited

U.S. PATENT DOCUMENTS 3,030,720 A    4/1962  Osswald et al.
3,185,590 A    5/1965  Mayer et al.
(Continued)

FOREIGN PATENT DOCUMENTS

CN    1389948    1/2003
EP     764489    3/1997
(Continued)

OTHER PUBLICATIONS

Jeon et al. Solvent-Free Polymer Electrolytes Based on Thermally Annealed Porous P(VdF-HFP)/P(EO-EC) Membranes.
(Continued)

*Primary Examiner* — Matthew J Merkling
(74) *Attorney, Agent, or Firm* — Meyertons, Hood, Kivlin, Kowert & Goetzel, P.C.; Mark R. DeLuca

(57) ABSTRACT

A lithium-sulphur electrochemical cell comprising a laminate comprising: a lithium anode comprising a layer of lithium metal foil or lithium metal alloy foil; a cathode comprising an active sulphur material; a porous separator disposed between the lithium anode and the cathode; and an electrolyte; wherein: the laminate is folded in a zigzag configuration; and the cathode is offset relative to the lithium anode in the laminate, such that the cathode is accessible from one side of the laminate and the lithium anode is accessible from an opposite side of the laminate.

14 Claims, 8 Drawing Sheets

(51) Int. Cl.
| | |
|---|---|
| *H01M 4/38* | (2006.01) |
| *H01M 10/052* | (2010.01) |
| *H01M 10/0583* | (2010.01) |
| *H01M 2/16* | (2006.01) |
| *H01M 4/58* | (2010.01) |

(52) U.S. Cl.
    CPC ....... *H01M 4/405* (2013.01); *H01M 10/0583* (2013.01); *H01M 4/5815* (2013.01)

(56) References Cited

U.S. PATENT DOCUMENTS

| | | | |
|---|---|---|---|
| 3,578,500 A | 5/1971 | Maricle et al. |
| 3,639,174 A | 2/1972 | Kegelman |
| 3,721,113 A | 3/1973 | Hovsepian |
| 3,778,310 A | 12/1973 | Garth |
| 3,877,983 A | 4/1975 | Hovsepian |
| 3,907,591 A | 9/1975 | Lauck |
| 3,907,597 A | 9/1975 | Mellors |
| 3,951,688 A | 4/1976 | Pankow et al. |
| 4,060,674 A | 11/1977 | Klemann et al. |
| 4,104,451 A | 8/1978 | Klemann et al. |
| 4,118,550 A | 10/1978 | Koch |
| 4,154,906 A | 5/1979 | Bubnick et al. |
| 4,163,829 A | 8/1979 | Kronenberg |
| 4,218,523 A | 8/1980 | Kalnoki-Kis |
| 4,252,876 A | 2/1981 | Koch |
| 4,303,748 A | 12/1981 | Armand et al. |
| 4,318,430 A | 3/1982 | Perman |
| 4,410,609 A | 10/1983 | Peled et al. |
| 4,499,161 A | 2/1985 | Foos |
| 4,503,234 A | 3/1985 | Huwiler et al. |
| 4,550,064 A | 10/1985 | Yen et al. |
| 4,690,877 A | 9/1987 | Gabano et al. |
| 4,725,927 A | 2/1988 | Morimoto et al. |
| 4,740,436 A | 4/1988 | Kobayashi et al. |
| 5,079,109 A | 1/1992 | Takami et al. |
| 5,219,684 A | 6/1993 | Wilkinson et al. |
| 5,368,958 A | 11/1994 | Hirai et al. |
| 5,460,905 A | 10/1995 | Skotheim |
| 5,462,566 A | 10/1995 | Skotheim |
| 5,523,179 A | 6/1996 | Chu |
| 5,529,860 A | 6/1996 | Skotheim et al. |
| 5,532,077 A | 7/1996 | Chu |
| 5,582,623 A | 12/1996 | Chu |
| 5,587,253 A | 12/1996 | Gozdz et al. |
| 5,648,187 A | 7/1997 | Skotheim |
| 5,744,262 A | 4/1998 | Cheng et al. |
| 5,789,108 A | 8/1998 | Chu |
| 5,797,428 A | 8/1998 | Miller |
| 5,814,420 A | 9/1998 | Chu |
| 5,919,587 A | 7/1999 | Mukherjee et al. |
| 5,961,672 A | 10/1999 | Skotheim et al. |
| 5,962,171 A | 10/1999 | Boguslavsky et al. |
| 6,030,720 A | 2/2000 | Chu et al. |
| 6,090,504 A | 7/2000 | Sung et al. |
| 6,117,590 A | 9/2000 | Skotheim et al. |
| 6,162,562 A | 12/2000 | Tsuji et al. |
| 6,174,621 B1 | 1/2001 | Skotheim et al. |
| 6,201,100 B1 | 3/2001 | Gorkovenko et al. |
| 6,210,831 B1 | 4/2001 | Gorkovenko et al. |
| 6,245,465 B1 | 6/2001 | Angell et al. |
| 6,302,928 B1 | 10/2001 | Xu et al. |
| 6,319,633 B1 | 11/2001 | Ikeda et al. |
| 6,344,293 B1 | 2/2002 | Geronov |
| 6,358,643 B1 | 3/2002 | Katz |
| 6,376,123 B1 | 4/2002 | Chu |
| 6,537,704 B1 | 3/2003 | Akashi et al. |
| 6,544,691 B1 | 4/2003 | Guidotti |
| 6,613,480 B1 | 9/2003 | Hwang et al. |
| 6,632,573 B1 | 10/2003 | Nimon et al. |
| 6,706,449 B2 | 3/2004 | Mikhaylik et al. |
| 6,733,924 B1 | 5/2004 | Skotheim et al. |
| 6,797,428 B1 | 9/2004 | Skotheim et al. |
| 7,108,942 B1 | 9/2006 | Gan et al. |
| 7,250,233 B2 | 7/2007 | Choi et al. |
| 7,335,440 B2 | 2/2008 | Aamodt et al. |
| 7,354,680 B2 | 4/2008 | Mikhaylik et al. |
| 2001/0008736 A1 | 7/2001 | Fanta et al. |
| 2002/0022181 A1 | 2/2002 | Tsujioka et al. |
| 2002/0034688 A1 | 3/2002 | Chu et al. |
| 2002/0039677 A1 | 4/2002 | Iwamoto et al. |
| 2002/0045101 A1 | 4/2002 | Hwang et al. |
| 2002/0045102 A1 | 4/2002 | Youngiu et al. |
| 2002/0102466 A1 | 8/2002 | Hwang et al. |
| 2002/0160258 A1 | 10/2002 | Lee et al. |
| 2002/0160263 A1* | 10/2002 | Corrigan ................ H01M 2/16 429/209 |
| 2002/0168574 A1 | 11/2002 | Ahn et al. |
| 2002/0192557 A1 | 12/2002 | Choi et al. |
| 2003/0073005 A1 | 4/2003 | Kim et al. |
| 2003/0175596 A1 | 9/2003 | Park et al. |
| 2003/0180611 A1 | 9/2003 | Mikhaylik et al. |
| 2003/0190530 A1 | 10/2003 | Yang et al. |
| 2004/0002002 A1 | 1/2004 | Mitzuta et al. |
| 2004/0028999 A1 | 2/2004 | LaLiberte |
| 2004/0048164 A1 | 3/2004 | Jung et al. |
| 2004/0053129 A1 | 3/2004 | Jung et al. |
| 2004/0072066 A1 | 4/2004 | Cho et al. |
| 2004/0091776 A1 | 5/2004 | Hwang |
| 2004/0096750 A1 | 5/2004 | Kim et al. |
| 2004/0101753 A1 | 5/2004 | Hwang |
| 2004/0137330 A1 | 7/2004 | Lee et al. |
| 2004/0157132 A1 | 8/2004 | Kim et al. |
| 2004/0219428 A1 | 11/2004 | Nagayama |
| 2004/0222768 A1 | 11/2004 | Moore et al. |
| 2004/0258996 A1 | 12/2004 | Kim et al. |
| 2005/0136327 A1 | 6/2005 | Miyake et al. |
| 2005/0156575 A1 | 7/2005 | Mikhaylik |
| 2005/0221192 A1 | 10/2005 | Hennige et al. |
| 2005/0238956 A1 | 10/2005 | Lee |
| 2005/0244693 A1 | 11/2005 | Strutt et al. |
| 2006/0024579 A1 | 2/2006 | Kolosnitsyn et al. |
| 2006/0051643 A1 | 3/2006 | Sarkar et al. |
| 2006/0105233 A1 | 5/2006 | Morita |
| 2006/0121355 A1 | 6/2006 | Kolosnitsyn et al. |
| 2006/0177741 A1 | 8/2006 | Kolosnitsyn et al. |
| 2006/0204856 A1 | 9/2006 | Ryu et al. |
| 2006/0234126 A1 | 10/2006 | Kolosnitsyn et al. |
| 2006/0292451 A1 | 12/2006 | Lee et al. |
| 2007/0072076 A1 | 3/2007 | Kolosnitsyn et al. |
| 2007/0281210 A1 | 12/2007 | Kolosnitsyn et al. |
| 2008/0038645 A1 | 2/2008 | Kolosnitsyn et al. |
| 2008/0060189 A1 | 3/2008 | Daidoji et al. |
| 2008/0100264 A1 | 5/2008 | Kolosnitsyn et al. |
| 2009/0053565 A1 | 2/2009 | Iacovelli |
| 2009/0111029 A1 | 4/2009 | Lee et al. |
| 2009/0246626 A1 | 10/2009 | Tasaki et al. |
| 2009/0317717 A1 | 12/2009 | Ryu et al. |
| 2010/0129724 A1 | 5/2010 | Kolosnitsyn et al. |
| 2010/0231168 A1 | 9/2010 | Kolosnitsyn et al. |
| 2011/0059361 A1 | 3/2011 | Wilkening et al. |
| 2012/0282530 A1 | 11/2012 | Chiang et al. |
| 2012/0293114 A1 | 11/2012 | Murochi et al. |
| 2012/0315553 A1 | 12/2012 | Fuminori et al. |
| 2015/0147656 A1 | 5/2015 | Kogetsu et al. |

FOREIGN PATENT DOCUMENTS

| | | |
|---|---|---|
| EP | 924783 | 6/1999 |
| EP | 710995 | 3/2001 |
| EP | 1176659 | 1/2002 |
| EP | 1178555 | 2/2002 |
| EP | 1400996 | 3/2004 |
| EP | 1420475 | 5/2004 |
| EP | 1865520 | 12/2007 |
| EP | 1962364 | 8/2008 |
| EP | 2023461 | 2/2009 |
| EP | 2026402 | 2/2009 |
| EP | 2259376 | 12/2010 |
| GB | 2084391 | 4/1982 |
| GB | 2200068 | 7/1988 |
| JP | 59194361 | 11/1984 |
| JP | 64-107467 | 4/1989 |

(56) References Cited

FOREIGN PATENT DOCUMENTS

| | | |
|---|---|---|
| JP | 01-124969 | 5/1989 |
| JP | 08069812 | 3/1996 |
| JP | 8-138742 | 5/1996 |
| JP | 08138650 | 5/1996 |
| JP | 8298229 | 11/1996 |
| JP | 8298230 | 11/1996 |
| JP | 09-027328 | 1/1997 |
| JP | 9147913 | 6/1997 |
| JP | 63-081767 | 4/1998 |
| JP | 10284076 | 10/1998 |
| JP | 11-273729 | 10/1999 |
| JP | 2001-167751 | 6/2001 |
| JP | 2001167751 | 6/2001 |
| JP | 2002-75446 | 3/2002 |
| JP | 2005-071641 | 3/2005 |
| JP | 2005-108724 | 4/2005 |
| JP | 2005-005215 | 6/2005 |
| JP | 2005-243342 | 9/2005 |
| JP | 2006134785 | 5/2006 |
| JP | 2009-087728 | 4/2009 |
| JP | 2011108469 | 6/2011 |
| JP | 2011-192574 | 9/2011 |
| KR | 10-2002-0089134 | 11/2002 |
| KR | 10-0368753 | 4/2003 |
| KR | 10-2003-0056497 | 7/2003 |
| KR | 10-2011-0024707 | 3/2011 |
| WO | 2001-047088 | 6/2001 |
| WO | 197304 | 12/2001 |
| WO | 2002-095849 | 11/2002 |
| WO | 2004021475 | 3/2004 |
| WO | 2006-050117 | 5/2006 |
| WO | 2007-111988 | 10/2007 |
| WO | 2007-132994 | 11/2007 |

OTHER PUBLICATIONS

Suo et al. "A New Class of Solvent-in-Salt Electrolyte for High-Energy Rechargeable Metallic Lithium Batteries" Nature Communications, 2013, vol. 4, p. 1481.
UK Search Report, Application No. GB 0416708.6, Section 17, dated Aug. 10, 2004.
UK Search Report, Application No. GB 0501001.2, dated Apr. 14, 2005.
Japanese Office Action for JP Application No. 2007-550839 dated Apr. 1, 2014.
Korean Office Action for Application No. 10-2013-7031637, dated Jan. 27, 2014.
International Search Report, Application No. PCT/GB2005/002850, dated Aug. 25, 2005.
Written Opinion, Application No. PCT/GB2005/002850, dated Aug. 25, 2005.
International Preliminary Report on Patentability, Application No. PCT/GB2005/002850, dated Jan. 30, 2007.
International Search Report, Application No. PCT/GB2006/000103, dated Jun. 20, 2007.
Written Opinion, Application No. PCT/GB2006/000103, dated Jun. 20, 2007.
International Preliminary Report on Patentability, Application No. PCT/GB2006/000103, dated Jul. 24, 2007.
International Search Report, Application No. PCT/GB2006/050300, dated Dec. 6, 2006.
Written Opinion, Application No. PCT/GB2006/050300, dated Dec. 6, 2006.
International Preliminary Report on Patentability, Application No. PCT/GB2006/050300, dated Mar. 26, 2008.
International Search Report, PCT Application No. PCT/GB2012/051633, dated Feb. 1, 2013.
Written Opinion, PCT Application No. PCT/GB2012/051633, dated Feb. 1, 2013.
International Preliminary Report on Patentability, PCT Application No. PCT/GB2012/051633, dated Jun. 17, 2014.

International Search Report, PCT Application No. PCT/GB2012/052728, dated Jan. 2, 2013.
Written Opinion, PCT Application No. PCT/GB2012/052728, dated Jan. 2, 2013.
International Preliminary Report on Patentability, PCT Application No. PCT/GB2012/052728, dated Aug. 19, 2014.
International Search Report, Application No. PCT/GB2014/05088, dated Jul. 7, 2014.
Written Opinion, Application No. PCT/GB2014/05088, dated Jul. 7, 2014.
International Preliminary Report on Patentability, Application No. PCT/GB2014/050888, dated Sep. 29, 2015.
International Search Report, Application No. PCT/GB2014/050890, dated Jun. 2, 2014.
Written Opinion, Application No. PCT/GB2014/050890, dated Jun. 2, 2014.
International Preliminary Report on Patentability, Application No. PCT/GB2014/050890, dated Sep. 29, 2015.
International Search Report, Application No. PCT/GB2014/050891, dated Jul. 24, 2014.
Written Opinion, Application No. PCT/GB2014/050891, dated Jul. 24, 2014.
International Preliminary Report on Patentability, Application No. PCT/GB2014/050891, dated Sep. 29, 2015.
International Search Report, Application No. PCT/GB2014/052474, dated Nov. 5, 2014.
Written Opinion, Application No. PCT/GB2014/052474, dated Nov. 5, 2014.
International Preliminary Report on Patentability, Application No. PCT/GB2014/052474, dated Feb. 16, 2016.
International Search Report, Application No. PCT/GB2014/053715, dated Feb. 27, 2015.
Written Opinion, Application No. PCT/GB2014/053715, dated Feb. 27, 2015.
International Preliminary Report on Patentability, Application No. PCT/GB2014/053715, dated Jun. 21, 2016.
International Search Report, Application No. PCT/GB2014/053719, dated Feb. 24, 2015.
Written Opinion, Application No. PCT/GB2014/053719, dated Feb. 24, 2015.
International Preliminary Report on Patentability, Application No. PCT/GB2014/053719, dated Jun. 21, 2016.
Cowie et al. "Ion Conduction in Macroporous Polyethylene Film Doped With Electrolytes" Solid State Ionics 109 (1998) 139-144.
U.S. Appl. No. 12/527,701, filed Jun. 18, 2009, Kolosnitsyn et al.
U.S. Appl. No. 11/190,203, filed Jul. 27, 2005, Kolosnitsyn et al.
U.S. Appl. No. 11/332,471, filed Jan. 17, 2006, Kolosnitsyn et al.
U.S. Appl. No. 11/386,113, filed Mar. 22, 2006, Kolosnitsyn et al.
U.S. Appl. No. 60/721,062, filed Sep. 28, 2005, Kolosnitsyn et al.
Bates et al., "Solvent Effects on Acid-Base Behavior: Five Uncharged Acids in Water-Sulfolane Solvents", 1976, Journal of Solution Chemistry, vol. 5, No. 3, p. 213-222.
Definitions of "slurry" and "suspension", Merriam Webster's, Collegiate Dictionary (10th Edition), printed Feb. 4, 2008.
Komaba et al., "Inorganic Electrolyte Additives to Supress the Degradation of Graphite Anodes by Dissolved Mn(II) for Lithium Ion Batteries", Mar. 2003, Journal of Power Sources, 1190121, p. 378-382.
Chagnes et al., "Butyrolactone-Ethylene Carbonate Based Electrolytes for Lithium Ion Batteries", Jul. 2003, Journal of Applied Electrochemistry, 33, p. 589-595.
Yamin H., Peled E, "Electrochemistry of a Nonaqueous Lithium/Sulphur Cell", J of Power Sources, 1983, vol. 9, p. 281-287.
D. Aurbach, E. Zinigrad, Y. Cohen, H. Teller, "A Short Review of Failure Mechanisms of Lithium Metal and Lithiated Graphite Anodes in Liquid Electrolyte Solutions", Solid State Ionics, 2002, vol. 148, p. 405-416.
Duck-Rye Chang, Suck-Hyun Lee, Sun-Wook Kim, Hee-Tak Kim, "Binary Electrolyte Based on Tetra (ethylene glycol) Dimethyl Ether and 1,3-dioxolane for Lithium-Sulphur Battery", J. Power Sources, 2002, vol. 112, p. 452-460.

(56) References Cited

OTHER PUBLICATIONS

Yamin H., Penciner J., Gorenshtein A., Elam M., Peled E., "The Electrochemical Behavior of Polysulphides in Tetrahydrofuran", J. of Power Sources, 1985, vol. 14, p. 129-134.
Yamin H., Gorenshtein A., Penciner J., Sternberg Y., Peled E., "Lithium Sulphur Battery Oxidation/Reduction Mechanisms of Polysulphides in THF Solution", J. Electrochem Soc. 1988, vol. 135, No. 5, p. 1045-1048.
J. Paris, V. Plichon, "Electrochemical Reduction of Sulphur in Dimethylacetamide", Electrochimica Acta, 1981, vol. 26, No. 12, p. 1823-1829.
Levillain E., Gaillard F., Leghie P., Demortier A., Lelieu J.P., "On the Understanding of the Reduction of Sulphur (S8) in Dimethylformamide (DMF)", J. of Electroanalytical Chemistry, 1997, vol. 420, p. 167-177.
Peled E., Gorenshrein A., Segal M., Sternberg Y, "Rechargeable Lithium-Sulphur Battery (extended abstract)", J. of Power Sources, 1989, vol. 26, p. 269-271.
Peled E., Sternberg Y., Gorenshtein A., Lavi Y., "Lithium-Sulphur Battery: Evaluation of Dioxolane-Based Electrolytes", J. Electrochem Soc., 1989, vol. 136, No. 6, p. 1621-1625.
Rauh R.D. Abraham K.M., Pearson G.F., Surprenant J.K., Brummer S.B., "A Lithium/Dissolved Sulphur Battery with an Organic Electrolyte", J. Electrochem Soc., 1979, vol. 126, No. 4, p. 523-527.
Rauh R.D., Shuker F.S., Marston J.M., Brummer S.B., "Formation of Lithium Polysulphides in Aprotic Media", J. inorg. Nucl Chem, 1977, vol. 39, p. 1761-1766.
Shin-Ichi Tobishima, Hideo Yamamoto, Minoru Matsuda, "Study on the Reduction Species of Sulfur by Alkali Metals in Nonaqueous Solvents", Electrochimica Acta, 1997, vol. 42, No. 6, p. 1019-1029.
Taitiro Fujinaga, Tooru Kuwamoto, Satoshi Okazaki, Masashi Horo, "Electrochemical Reduction of Elemental Sulphur in Acetonitrile", Bull Chem. Soc. Jpn. 1980, vol. 53, p. 2851-2855.
Gholam-Abbas Nazri, Gianfranco Pistoia, "Lithium Batteries: Science and Technology", 2003, p. 509-573, Hardcover, ISBN: 978-1-4020-7628-2.
Office Action, U.S. Appl. No. 11/290,825, dated Jun. 11, 2009.
Office Action, U.S. Appl. No. 11/526,876, dated Oct. 30, 2009.
Office Action, U.S. Appl. No. 11/190,203, dated Oct. 9, 2009.
Office Action, U.S. Appl. No. 11/190,203, dated Apr. 3, 2009.
Office Action, U.S. Appl. No. 11/332,471, dated Jul. 31, 2009.
Office Action, U.S. Appl. No. 11/332,471, dated Feb. 26, 2009.
Office Action, U.S. Appl. No. 11/332,471, dated Aug. 27, 2008.
Office Action, U.S. Appl. No. 11/332,471, dated Sep. 28, 2007.
Office Action, U.S. Appl. No. 11/332,471, dated Mar. 11, 2008.
Office Action, U.S. Appl. No. 11/332,471, dated Feb. 20, 2007.
Office Action, U.S. Appl. No. 11/332,471, dated Aug. 21, 2007.
Office Action, U.S. Appl. No. 11/386,113, dated Jan. 6, 2009.
Office Action, U.S. Appl. No. 11/386,113, dated Aug. 19, 2008.
Office Action, U.S. Appl. No. 11/386,113, dated Feb. 5, 2008.
Notice of Allowance, U.S. Appl. No. 11/386,113, dated Jul. 24, 2009.
Office Action, U.S. Appl. No. 11/889,334, dated Aug. 14, 2009.
"Transportation Regulations for Lithium, Lithium Ion and Polymer Cells and Batteries", Ultralife Batteries, Inc. Rev. H, Dec. 18, 2003.
V.S. Kolosnitsyn, L.V. Sheina and S.E. Mochalov, "Physicochemical and Electrochemical Properties of Sulfolane Solutions of Lithium Salts", May 2008, p. 575-578, MAIK Nauka/Interperiodica distributed exclusively by Springer Science+Business Media, LLC.

* cited by examiner

LAMINATED LITHIUM-SULPHUR CELL

BACKGROUND

The present invention relates to a lithium-sulphur cell comprising a laminate that is folded in a zigzag configuration.

A typical lithium-sulphur cell comprises an anode (negative electrode) formed from lithium metal or a lithium metal alloy and a cathode (positive electrode) formed from elemental sulphur or other electroactive sulphur material. The sulphur or other electroactive sulphur-containing material may be mixed with an electrically conductive material, such as carbon, to improve its electrical conductivity. Typically, the carbon and sulphur are ground and then mixed with a solvent and binder to form a slurry. The slurry is applied to a current collector and then dried to remove the solvent. The resulting structure is calendared to form a composite sheet of cathodic material deposited on a current collector, which is cut into the desired shape to form a cathode. Electrolyte is applied to the cathode. A separator is then placed over the cathode and a lithium anode placed over the separator.

To date, lithium-sulphur cells have been produced by a batch process comprising a number of time-consuming steps. For example, the composite sheets of cathodic material and sheets of lithium metal or lithium metal alloy have to be cut to a desired shape prior to cell assembly. In particular, the sheets have to be cut in such a way so as to provide protruding portions or tabs to which contact leads may be welded. This can add to the complexity of the overall process. Moreover, in known methods of cell assembly, individual, pre-cut individual sheets of cathode, separator and anode are placed over one another in a batch process. Such processes can be difficult to automate.

The present inventors have designed a lithium-sulphur cell that can be assembled in an efficient and effective manner. The present inventors have also developed an efficient and effective process for manufacturing a lithium-sulphur cell.

DESCRIPTION

Before particular examples of the present invention are described, it is to be understood that the present disclosure is not limited to the particular cell, method or material disclosed herein. It is also to be understood that the terminology used herein is used for describing particular examples only and is not intended to be limiting, as the scope of protection will be defined by the claims and equivalents thereof.

In describing and claiming the cell and method of the present invention, the following terminology will be used: the singular forms "a", "an", and "the" include plural forms unless the context clearly dictates otherwise. Thus, for example, reference to "an anode" includes reference to one or more of such elements.

According to one aspect of the present invention, there is provided a lithium-sulphur electrochemical cell comprising a laminate comprising:
   a lithium anode comprising a layer of lithium metal foil or lithium metal alloy foil;
   a cathode comprising an active sulphur material;
   a porous separator between the lithium anode and the cathode; and
   electrolyte;
   wherein:
   the laminate is folded in a zigzag configuration; and
   the cathode is offset relative to the lithium anode in the laminate, such that the cathode is accessible from one side of the laminate and the lithium anode is accessible from an opposite side of the laminate.

According to a further aspect of the present invention, there is provided a method of manufacturing a lithium-sulphur cell, said method comprising:
   forming a laminate of i) a lithium anode comprising a layer of lithium metal or lithium metal alloy foil, ii) a porous separator; iii) electrolyte and iv) a cathode comprising an active sulphur material, whereby the separator is disposed between the lithium anode and the cathode and the cathode is offset relative to the lithium anode in the laminate, such that the cathode is accessible from one side of the laminate and the lithium anode is accessible from an opposite side of the laminate; and
   folding the laminate in a zigzag configuration.

The cell of the present invention may be assembled by providing the cathode, separator and anode as sheets or webs of material that can be laminated together to form a laminate. Advantageously, therefore, the laminate can be formed as a flow (e.g. continuous flow) web of material. By offsetting the cathode relative to the anode in the laminate, the cathode can be accessed from one side of the laminate and the anode can be accessed from the other. Advantageously, therefore, the cathode and anode can be accessed from the laminate without it being necessary to cut the anode or cathode in any particular way prior to lamination. In one embodiment, the cathode, separator and anode are fed from respective rolls of web material. For example, the rolls of the cathode and anode material may be offset relative to each other to ensure that these components are offset in the resulting laminate. Accordingly, the cathode and the anode can be offset relative to one another in a direction perpendicular to the longitudinal axis of the laminate. Offsetting the cathode and anode in a direction perpendicular to the longitudinal axis of the laminate can facilitate continuous manufacture of the laminate as rolls of cathode and anode material may conveniently be offset in a direction perpendicular to the flow of cathode and anode material (see below). An advantage of the cell of the present invention is that it can be manufactured in a continuous process. A further advantage is that the cell lends itself to manufacture using a process that can be conveniently automated.

In one embodiment, the cathode comprising an active sulphur material is provided as a web of material, preferably as a continuous flow of web material. Electrolyte may be applied to the cathode, for example, by contacting the electrolyte with the active sulphur material. This contacting step may be carried out in any suitable way, for example, by spraying, extruding, pouring and/or spreading the electrolyte over the active sulphur material. The electrolyte may, in certain embodiments, be applied (e.g. by spraying) to a moving web of the cathode, for example, as a continuous or intermittent spray.

Before or after (preferably after) the electrolyte is applied to the cathode, a porous separator may be applied to the cathode, for example, as a flow (e.g. continuous flow) of web material. Once electrolyte is applied to the cathode, it desirably soaks into the pores of the separator. Accordingly, the electrolyte may wet the cathode and the separator. The lithium anode may then be laminated onto the separator as a continuous flow of web material to form the laminate. Preferably, the laminate is formed as a flow (e.g. continuous flow) of web material, whereby the web of the lithium anode material and web of cathode material are offset relative to one another in a direction perpendicular to the direction of flow. In a preferred embodiment, therefore, the cathode is offset relative to the anode in a direction perpendicular to the longitudinal axis of the laminate. The laminate may be folded along its length (i.e. along the longitudinal axis of the laminate) in a zigzag configuration before or after cutting the laminate material to a predetermined length. By offsetting the anode relative to the cathode in a direction perpendicular to the longitudinal axis of the laminate, the cathode may be accessible from one side of the laminate, while the anode may be accessible from the opposite side of the laminate. Preferably, the laminate is folded prior to cutting.

Preferably, the laminate further comprises a further lithium anode and a further porous separator containing electrolyte. The cathode is preferably disposed between the lithium anodes and a porous separator is disposed between the cathode and each lithium anode. In a preferred embodiment, the lithium anodes are disposed, such that both lithium anodes are accessible from the opposite side of the laminate. For example, the lithium anodes may be aligned with one another. The anodes may be contacted with one another at the relevant side of the laminate. This may allow a single contact lead to be used to supply and draw current from the anodes in the cell. The contact lead may be welded onto the anode(s).

Where the laminate comprises two lithium anodes and two porous separators, a lithium anode and porous separator may be applied to each side of the cathode. In one embodiment, the cathode comprises a layer comprising a mixture of active sulphur material and an electroconductive material deposited on either side of a current collector. Electrolyte may, advantageously, be applied to the layer on either side of the current collector. Before or after application of the electrolyte, a porous separator may be applied to either side of the current collector. Thereafter, a lithium anode may be applied to each separator to form the laminate. As mentioned above, the cathode, separators and anodes may be provided as continuous webs of material. Advantageously, therefore, the laminate can be formed as a continuous web.

As discussed above, the lithium anode comprises a layer of lithium metal foil or lithium metal alloy foil. The layer of lithium metal foil or lithium metal alloy foil may have a thickness of 20 to 120 µm, preferably 30 to 50 µm. The layer of lithium metal foil or lithium metal alloy foil may initially be placed in contact with a supporting substrate. In other words, the anode may initially be provided as an anode precursor comprising a layer of lithium metal foil or alloy foil supported on a substrate. Suitable substrates include those formed of a polymeric material, such as polypropylene. The substrate may serve to support the foil layer during the manufacture of the cell and, in particular, during the lamination step. Preferably, the foil is simply placed in contact with the substrate without bonding. In one embodiment, a roll of substrate material and a roll of lithium metal foil or lithium metal alloy foil are provided. Material may be dispensed from each of these rolls to produce the anode precursor as a flow of web material. This web may be fed into the lamination process, for example, in a continuous manner. Desirably, the substrate is removed from the laminate, for example, prior to the folding step. This may be achieved by simply collecting the substrate material on a roll once the laminate of the cell is produced.

In a preferred embodiment, the lithium anode comprises a discontinuous layer of lithium metal foil or lithium alloy foil. For example, the layer of lithium metal foil or lithium alloy foil may be absent at intervals, preferably regular intervals along the length of the anode. In one example, the lithium anode comprises a series of regions or strips of substantially uniform width along the length of the anode in which the layer of lithium metal foil or lithium alloy foil. These "void" regions may advantageously be spaced apart by a substantially uniform amount. Preferably, the void regions coincide with the points along which the laminate is cut for use. Advantageously, the voids reduce or eliminate the risk of short-circuiting in the assembled cell, as the risk of the anode being pressed into contact with the cathode during cutting is reduced or eliminated.

The void regions of the lithium anode may be prepared using any suitable method. For example, where the lithium anode initially comprises a layer of lithium metal foil or lithium alloy foil placed on a substrate, sections of the layer may be removed by cutting or scraping. In one embodiment, sections of the layer are removed by passing the lithium anode between a pair of rollers, one of which is provided with cutters configured to cut or scrape sections of the layer of lithium metal or lithium alloy from the non-conducting anode substrate. This allows the sections to be removed from the lithium anode as a continuous web of lithium anode material is fed between the rollers. Accordingly, the void regions can be formed as the material is fed into the lamination process in a continuous process. Once the laminate is formed, the substrate may be removed, for example, by peeling.

Once the laminate is formed, contact leads may be attached to the accessible anode and cathode of the laminate. The laminate may then be sealed in an air and moisture tight container.

As described above, the cathode comprises an electroactive sulphur material. Preferably, the electroactive sulphur material is admixed with an electroconductive material. This mixture forms an electroactive layer, which may be placed in contact with a current collector.

The mixture of electroactive sulphur material and electroconductive material may be applied to the current collector in the form of a slurry in a solvent (e.g. water or an organic solvent). The solvent may then be removed and the resulting structure calendared to form a composite structure. In a preferred embodiment, the electroactive sulphur material and, optionally, the electroconductive material do not cover the entire area of the current collector. For example, the edges of the current collector may remain exposed, such that the current collector of the cathode is accessible from one side of the laminate. Advantageously, this allows contact leads to be welded or otherwise bonded to the cathode in a convenient manner.

The electroactive sulphur material may comprise elemental sulphur, sulphur-based organic compounds, sulphur-based inorganic compounds and sulphur-containing polymers. Preferably, elemental sulphur is used.

The solid electroconductive material may be any suitable conductive material. Preferably, this solid electroconductive material may be formed of carbon. Examples include carbon black, carbon fibre and carbon nanotubes. Other suitable materials include metal (e.g. flakes, filings and powders) and conductive polymers. Preferably, carbon black is employed.

The weight ratio of electroactive sulphur material (e.g. elemental sulphur) to electroconductive material (e.g. carbon) may be 1 to 30:1; preferably 2 to 8:1, more preferably 5 to 7:1.

The mixture of electroactive sulphur material and electroconductive material may be a particulate mixture. The mixture may have an average particle size of 50 nm to 20 microns, preferably 100 nm to 5 microns.

The mixture of electroactive sulphur material and electroconductive material (i.e. the electroactive layer) may optionally include a binder. Suitable binders may be formed from at least one of, for example, polyethyelene oxide, polytetrafluoroethylene, polyvinylidene fluoride, ethylene-propylene-diene rubber, methacrylate (e.g. UV-curable methacrylate), and divinyl esters (e.g. heat curable divinyl esters).

Suitable current collectors include metal substrates, such as foil, sheet or mesh formed of a metal or metal alloy. In a preferred embodiment, the current collector is aluminium foil.

The separator may be any suitable porous substrate that allows ions to move between the electrodes of the cell. The porosity of the substrate should be at least 30%, preferably at least 50%, for example, above 60%. Suitable separators include a mesh formed of a polymeric material. Suitable polymers include polypropylene, nylon and polyethylene. Non-woven polypropylene is particularly preferred. It is possible for a multi-layered separator to be employed.

The separator should be positioned between the electrodes to prevent direct contact between the electrodes. The sides of the separator need not be aligned with the anode or the cathode. For example, the separator may be offset relative to the cathode and/or anode. In one embodiment where the cell comprises first and second anodes on either side of a cathode, a separator may be positioned between the cathode and each anode, such that, in the region of the laminate from which the anodes are accessible, the separators extend beyond the cathode to a position intermediate the cathode and the anodes. This allows the anodes to be pressed together along the relevant side of the laminate without the anodes and cathode coming into direct contact. Advantageously, this may reduce or eliminate the risk of short circuit of the cell.

As discussed above, the cell comprises an electrolyte. The electrolyte is present or disposed between the electrodes, allowing charge to be transferred between the anode and cathode. Preferably, the electrolyte wets the pores of the cathode as well as the pores of the separator. Preferably, the electrolyte comprises at least one lithium salt and at least one organic solvent. Suitable lithium salts include at least one of lithium hexafluorophosphate ($LiPF_6$), lithium hexafluoroarsenate ($LiAsF_6$), lithium perchlorate ($LiClO_4$), lithium trifluoromethanesulfonimide ($LiN(CF_3SO_2)_2$)), lithium borofluoride and lithium trifluoromethanesulphonate ($CF_3SO_3Li$). Preferably the lithium salt is lithium trifluoromethanesulphonate.

Suitable organic solvents are tetrahydrofurane, 2-methyltetrahydrofurane, dimethylcarbonate, diethylcarbonate, ethylmethylcarbonate, methylpropylcarbonate, methylpropylpropionate, ethylpropylpropionate, methyl acetate, dimethoxyethane, 1,3-dioxolane, diglyme (2-methoxyethyl ether), tetraglyme, ethylene carbonate, propylene carbonate, □-butyrolactone, dioxolane, hexamethyl phosphoamide, pyridine, dimethyl sulfoxide, tributyl phosphate, trimethyl phosphate, N,N,N,N-tetraethyl sulfamide, and sulfone and their mixtures. Preferably, the organic solvent is a sulfone or a mixture of sulfones. Examples of sulfones are dimethyl sulfone and sulfolane. Sulfolane may be employed as the sole solvent or in combination, for example, with other sulfones.

The organic solvent used in the electrolyte should be capable of dissolving the polysulphide species, for example, of the formula $S_n^{2-}$, where n=2 to 12, that are formed when the electroactive sulphur material is reduced during discharge of the cell.

The concentration of lithium salt in the electrolyte is preferably 0.1 to 5M, more preferably 0.5 to 3M, for example, 1M. The lithium salt is preferably present at a concentration that is at least 70%, preferably at least 80%, more preferably at least 90%, for example, 95 to 99% of saturation.

Embodiments of the present invention will now be described, by way of example, with reference to the accompanying drawings, in which.

Figure 1:
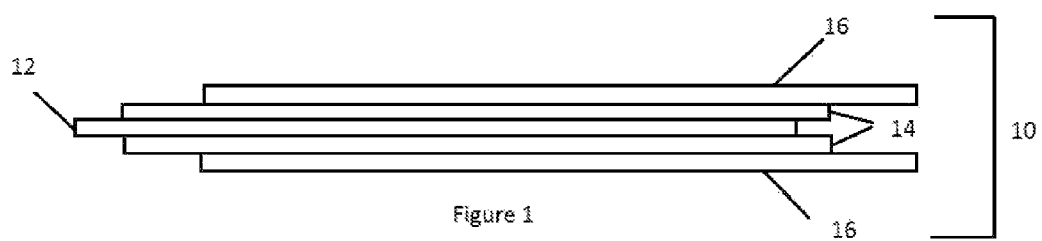
FIG. 1 is a schematic cross-sectional view of a laminate that may be used in a cell according to an embodiment of the present invention.

Reference is first made to FIG. 1, which depicts a cross-sectional view of a laminate for use in a cell according to an embodiment of the invention. The laminate 10 comprises a cathode 12, separators 14 and lithium anodes 16. The cathode 12 comprises an electroactive layer (not shown) comprising an active sulphur material and an electroconductive material. The lithium anodes 16 are formed from lithium metal foil or lithium alloy foil, optionally supported by a non-conductive substrate (not shown). As can be seen from the Figure, the cathode 12 and anodes 16 are offset in a direction perpendicular to the longitudinal axis of the laminate (which longitudinal axis can be envisaged as coming out or going into the page), such that the cathode 12 is accessible from one side of the laminate 10, while the anodes are accessible from the opposite side of the laminate 10. The anodes 16 in this embodiment are aligned. The separators 14 are positioned or sized relative to anodes 16 and cathode 12, such that, in the region of the laminate 10 from which the lithium anodes 16 are accessible, the separators 14 extend beyond the cathode 12 to a position intermediate the cathode 12 and the anodes 16. Accordingly, the lithium anodes 16 may be pressed together along that side of the laminate 10 without the anodes 16 and cathode 12 coming into direct contact. This has the advantage of reducing or eliminating the risk of short circuit of the cell.

Figure 2:
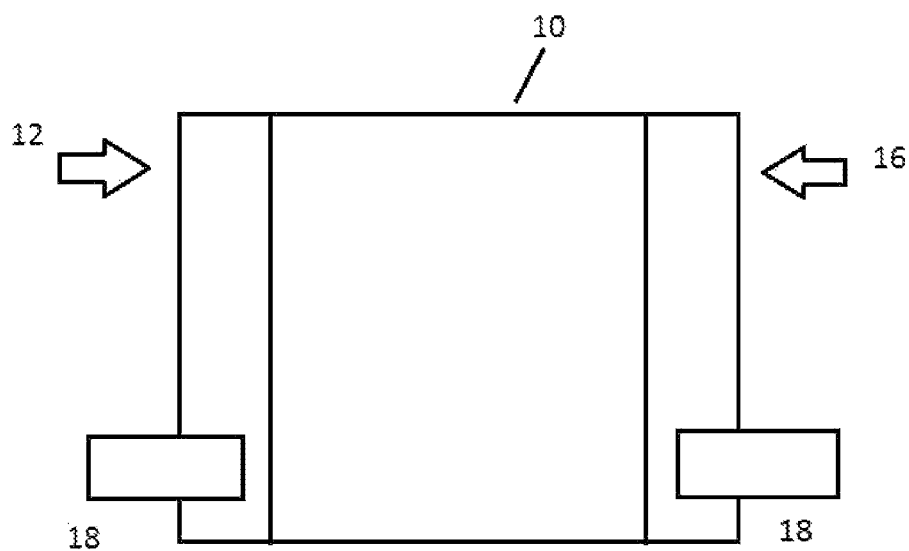
FIG. 2 is a schematic plan view of a folded laminate that may be used in a cell according to an embodiment of the present invention.
Figure 3:
FIG. 3 is a schematic side view of a folded laminate that may be used in a cell according to an embodiment of the present invention.

Reference is now made to FIGS. 2 and 3, which depict a laminate 10 for use in a cell according to an embodiment of the invention in a folded configuration. As best seen schematically from FIG. 3, the laminate is folded along its length or longitudinal axis in a zigzag configuration. As can be seen from FIG. 2, the anodes 16 are accessible from one side of the laminate 10, while the cathode 12 is accessible from the other side of the laminate 10. Contact tabs 18 may be applied to the anodes 16 and cathode 12 to facilitate connection to contact leads, for example, by welding.

Figure 4:
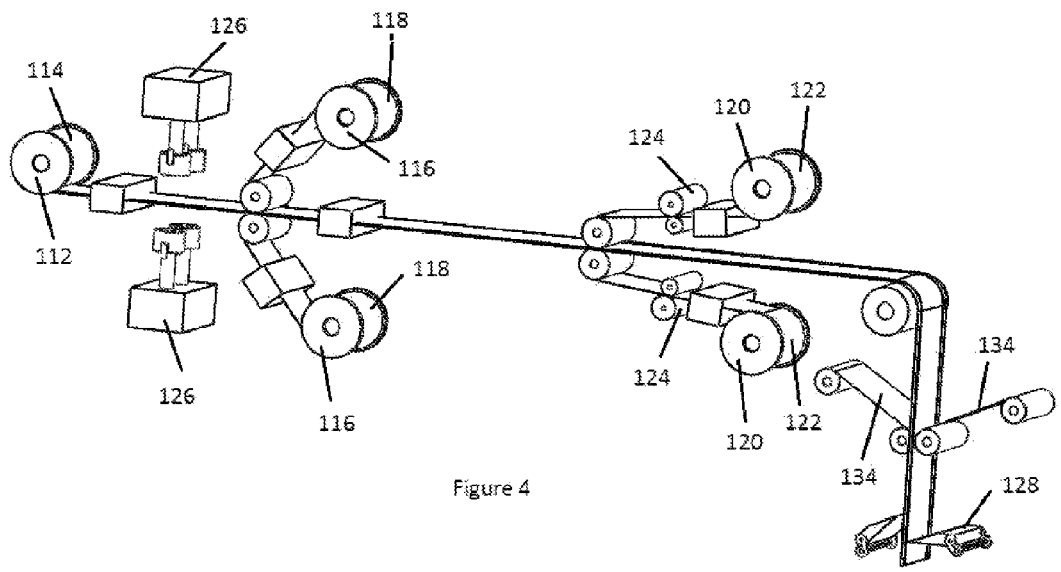
FIG. 4 is a schematic view of an apparatus that may be used to produce a laminate for use in a cell according to an embodiment of the present invention.

FIG. 4 is a schematic view of an apparatus that may be used to produce a laminate for use in a cell according to an embodiment of the present invention. The apparatus comprises a roll 112 of cathode web 114, rolls 116 of separator web 118 and rolls 120 of anode web 122. The apparatus 100 also comprises guide rollers for guiding the webs through the apparatus, as well as a pair of cutting rollers 124 for preparing the anode web 122 for lamination (see below). The apparatus 100 is also provided with spraying units 126 for applying electrolyte to both sides of the cathode web 114, as well as a folding device 128, which folds the laminate produced in a zigzag configuration.

The cathode web 114 comprises an electroactive layer of an active sulphur material (e.g. sulphur) and an electroconductive material (e.g. carbon). The layer is deposited on both sides of a current collector of, for example, aluminium foil. Advantageously the edges of the web 114 are left uncovered by the electroactive layer, such that the current collector remains accessible from the resulting laminate.

Figure 6A:
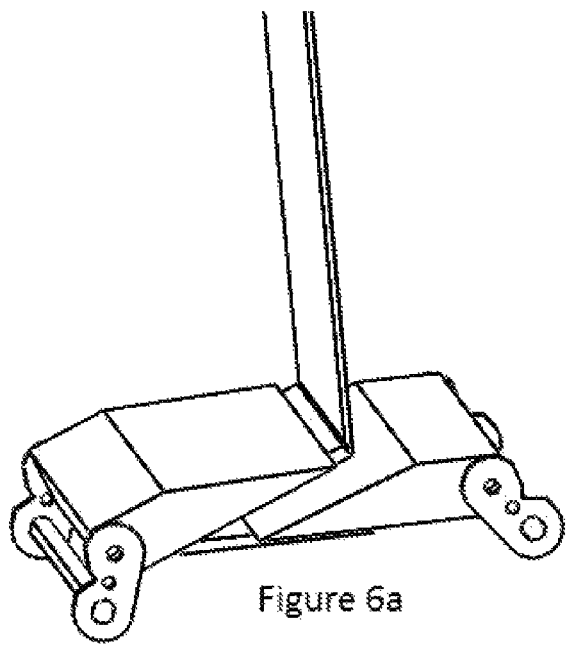
FIGS. 6a and 6b are schematic views of a folding device that may be used to fold a laminate for use in a cell according to an embodiment of the present invention.
Figure 6B:
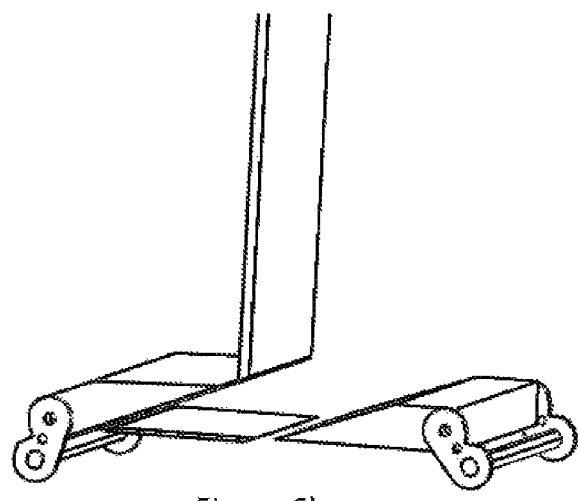

In operation, the cathode web 114 is continuously fed from roll 112. Electrolyte is sprayed onto both sides of the moving web 114 using spraying units 126. Separator web 118 is continuously fed from rolls 116 and laminated onto the cathode web 114. Thereafter, anode web 122 is continuously fed from rolls 120 and laminated onto the separator web 118. The resulting laminate is continuously fed as a web to the folding device 128, which folds the laminate in a zigzag configuration. FIGS. 6a and 6b are enlarged views of the folding device 128. The folded laminate may then be cut to the desired length (not shown).

Figure 5A:
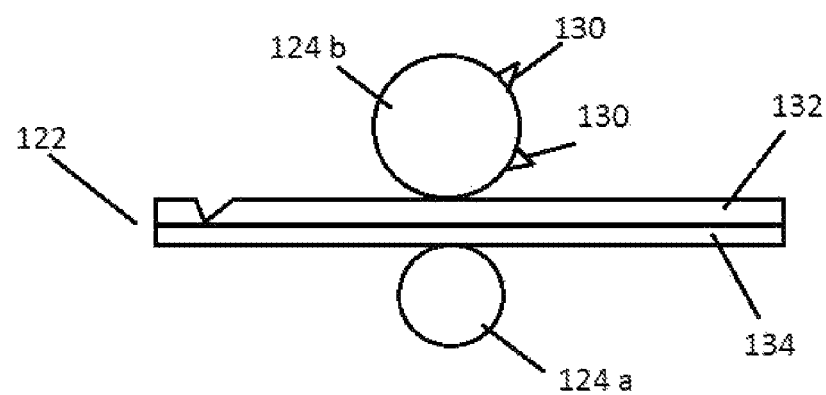
FIGS. 5a and 5b are schematic views of rollers that may be used to cut a cathode for use in a cell according to an embodiment of the present invention.
Figure 5B:
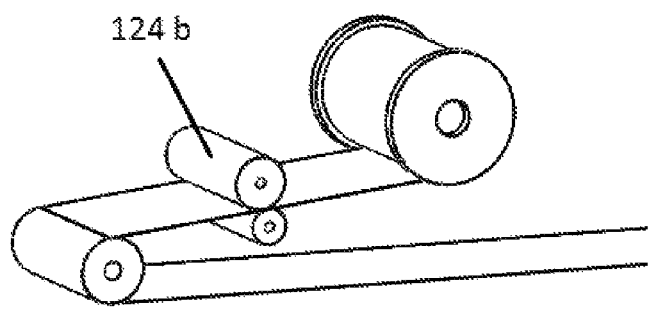

The anode web 122 initially comprises a layer 132 of lithium metal or lithium alloy foil supported on substrate 134 of, for example, polypropylene (see FIG. 5a). Before the anode web 122 is laminated onto the separator web 118, it is cut to remove sections of the layer of lithium metal or lithium alloy at regular intervals along the length of the web 122. As can be seen from FIGS. 5a and 5b, this can be achieved using the cutting rollers 124a and 124b. Roller 124b is provided with cutters 130, which are spaced apart on the roller 124b. As the anode web 122 is fed through the rollers 124, the cutters 130 remove a portion of the lithium metal or lithium alloy layer 132 from the substrate 134 to provide a void region or strip where the anode web is devoid of lithium metal foil or lithium alloy foil. By ensuring that the anode web 122 is fed at a constant rate through the cutting rollers 124a and 124b, it is possible to ensure that the void regions are of a substantially uniform size and are substantially uniformly spaced from one another. These voids mark the points at which the laminate should be cut. Advantageously, the voids reduce or eliminate the risk of short-circuiting in the assembled cell, as the risk of the anode being pressed into contact with the cathode during cutting is reduced or eliminated.

Once the laminate is formed, the substrate 134 is removed from the laminate. Contact leads may be attached to the laminate e.g. by welding. The laminate may then be sealed in an air and moisture tight container (not shown).

The invention claimed is:

1. A lithium-sulphur electrochemical cell comprising a laminate comprising:
   a lithium anode comprising a layer of lithium metal foil or lithium metal alloy foil;
   a cathode comprising an active sulphur material;
   a porous separator disposed between the lithium anode and the cathode; and
   an electrolyte; wherein:
   the laminate is folded in a zigzag configuration; and
   wherein the cathode is offset relative to the lithium anode in the laminate in a direction perpendicular to the longitudinal axis of the laminate, such that the cathode is accessible from one side of the laminate and the lithium anode is accessible from an opposite side of the laminate.

2. The cell of claim 1, wherein the layer of lithium metal foil or lithium alloy foil is absent at the ends of the folded laminate.

3. The cell of claim 1, wherein the cathode comprises a layer comprising a mixture of active sulphur material and electroconductive material deposited on a current collector.

4. The cell of claim 3, wherein the current collector is formed of metal foil.

5. The cell of claim 1, further comprising a further lithium anode and a further porous separator, wherein:
   the cathode is disposed between the lithium anodes and a porous separator is disposed between the cathode and each lithium anode, and
   the lithium anodes are disposed such that both lithium anodes are accessible from the opposite side or end of the folded laminate.

6. A method of manufacturing a lithium-sulphur cell, said method comprising:
   forming a laminate of i) a lithium anode comprising a layer of lithium metal or lithium metal alloy foil, ii) a porous separator; iii) electrolyte; and iv) a cathode comprising an active sulphur material, whereby the separator is disposed between the lithium anode and the cathode and wherein the cathode is offset relative to the lithium anode in the laminate in a direction perpendicular to the longitudinal axis of the laminate, such that the cathode is accessible from one side of the laminate and the lithium anode is accessible from an opposite side of the laminate; and
   folding the laminate in a zigzag configuration.

7. The method of claim 6, wherein the laminate further comprises a further lithium anode and a further porous separator containing electrolyte, wherein:
   the cathode is disposed between the lithium anodes and a porous separator is disposed between the cathode and each lithium anode, and
   the lithium anodes are disposed such that both lithium anodes are accessible from the opposite side of the laminate.

8. The method of claim 6, further comprising:
   providing the cathode comprising an active sulphur material as a flow of web material;
   applying electrolyte to the cathode;
   laminating the porous separator onto the cathode as a flow of web material; and
   laminating the lithium anode onto the separator as a flow of web material to form the laminate as a flow of web material;
   wherein the electrolyte is applied to the cathode before or after the porous separator is laminated onto the cathode.

9. The method of claim 8, further comprising folding the web of laminate material in a zigzag configuration and cutting the laminate material to a predetermined length.

10. The method of claim 8, wherein the web material of the anode comprises a discontinuous layer of lithium metal foil or lithium alloy foil, and wherein the laminate is cut along the discontinuities of the layer.

11. The method of claim 10, wherein the lithium anode is initially provided as an anode precursor comprising a layer of lithium metal foil or lithium alloy foil supported on a substrate and wherein, the precursor is provided as a web of material and, at regular intervals along the length of the web material, sections of the layer of lithium metal foil or lithium alloy foil are removed from the substrate.

12. The method of claim 11, wherein the sections are removed before the lithium anode is laminated onto the separator.

13. The method of claim 11, wherein the sections are removed by passing the precursor between a pair of rollers, one of which is provided with cutters configured to cut or scrape sections of the layer of lithium metal or lithium alloy from the substrate.

14. The method of claim 11, further comprising removing the substrate of the anode precursor from the laminate.

\* \* \* \* \*